US011314641B2

(12) United States Patent
Craske (10) Patent No.: US 11,314,641 B2
(45) Date of Patent: Apr. 26, 2022

(54) APPARATUS AND METHOD FOR EXECUTING INSTRUCTION USING RANGE INFORMATION ASSOCIATED WITH A POINTER

(71) Applicant: ARM LIMITED, Cambridge (GB)

(72) Inventor: Simon John Craske, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/741,830

(22) PCT Filed: Jun. 14, 2016

(86) PCT No.: PCT/GB2016/051758
§ 371 (c)(1),
(2) Date: Jan. 4, 2018

(87) PCT Pub. No.: WO2017/009598
PCT Pub. Date: Jan. 19, 2017

(65) Prior Publication Data
US 2018/0196746 A1    Jul. 12, 2018

(30) Foreign Application Priority Data

Jul. 10, 2015 (GB) .................................. 1512102

(51) Int. Cl.
*G06F 12/06* (2006.01)
*G06F 9/35* (2018.01)
(Continued)

(52) U.S. Cl.
CPC ............ *G06F 12/06* (2013.01); *G06F 9/3013* (2013.01); *G06F 9/35* (2013.01); *G06F 12/1441* (2013.01); *G06F 2212/1008* (2013.01)

(58) Field of Classification Search
None
See application file for complete search history.

(56) References Cited

U.S. PATENT DOCUMENTS 8,082,399 B2    12/2011  Pasch et al.
8,850,573 B1 *   9/2014  Chen ................... G06F 9/30145
                                                    726/1
(Continued)

FOREIGN PATENT DOCUMENTS

CN    102461092    5/2012
JP    H03-116248   5/1991

OTHER PUBLICATIONS

International Search Report for PCT/GB2016/051758, dated Oct. 19, 2016, 4 pages.
Written Opinion of the ISA for PCT/GB2016/051758, dated Oct. 19, 2016, 5 pages.
Combined Search and Examination Report for GB1512102.3, dated Jan. 8, 2016, 6 pages.
(Continued)

*Primary Examiner* — Charles J Choi
(74) *Attorney, Agent, or Firm* — Nixon & Vanderhye P.C.

(57) ABSTRACT

An apparatus (2) comprises one or more bounded pointer storage element (60s) each to store a pointer (62) having associated range information (64) indicating an allowable range of addresses for the pointer (62). Processing circuitry (4) performs, in response to a first type of instruction (70) identifying a given bounded pointer storage element, a predetermined operation for a target range of addresses determined at least in part on the basis of the range information (64) associated with the pointer stored in the given bounded pointer storage element (60).

19 Claims, 5 Drawing Sheets

(51) Int. Cl.
*G06F 12/14* (2006.01)
*G06F 9/30* (2018.01)

(56) References Cited

U.S. PATENT DOCUMENTS

| | | | |
|---|---|---|---|
| 2008/0244608 A1 | 10/2008 | Daito | |
| 2010/0174893 A1 | 7/2010 | Rivera | |
| 2011/0078389 A1 | 3/2011 | Patel et al. | |
| 2012/0260031 A1* | 10/2012 | Chachad | H03K 19/0016 711/104 |
| 2014/0176187 A1* | 6/2014 | Jayasena | H03K 19/1776 326/39 |
| 2016/0092702 A1* | 3/2016 | Durham | G06F 9/34 713/190 |

OTHER PUBLICATIONS

Woodruff et al., "CHERI: A RISC capability machine for practical memory safety", Technical Report, No. 858, University of Cambridge, Computer Laboratory, Jul. 2014, 112 pages.
Woodruff et al., "The CHERI Capability Model: Revisiting RISC in an age of Risk", IEEE, 2014, 12 pages.
Watson et al., "Capability Hardware Enhanced RISC Instructions: CHERI Instruction-set Architecture", Technical Report, No. 850, University of Cambridge, Computer Laboratory, Apr. 2014, 131 pages.
First Office Action for CN Application No. 201680039576.6 dated Jun. 23, 2021 and English translation, 24 pages.
Office Action for EP Application No. 16731256.0 dated May 14, 2020, 8 pages.
Second Office Action for CN Application 201680039576.6 dated Jan. 30, 2022 and English translation, 28 pages.

* cited by examiner

FIG. 10 ual phase of International
APPARATUS AND METHOD FOR EXECUTING INSTRUCTION USING RANGE INFORMATION ASSOCIATED WITH A POINTER This application is the U.S. national phase of International Application No. PCT/GB2016/051758 filed 14 Jun. 2016, which designated the U.S. and claims priority to GB Patent Application No. 1512102.3 filed 10 Jul. 2015, the entire contents of each of which are hereby incorporated by reference.

The present technique relates to the field of data processing.

Some data processing apparatuses may support bounded pointers where a pointer indicating a particular address is associated with range information indicating an allowable range of addresses for the pointer. For example, such pointers may be referred to as "fat pointers".

At least some examples provide an apparatus comprising:
one or more bounded pointer storage elements, each to store a pointer having associated range information indicative of an allowable range of addresses for said pointer; and
processing circuitry to perform, in response to a first type of instruction identifying a given bounded pointer storage element, a predetermined operation for a target range of addresses determined at least in part on the basis of the range information associated with the pointer stored in the given bounded pointer storage element.

At least some examples provide an apparatus comprising:
at least one means for storing a pointer having associated range information indicative of an allowable range of addresses for said pointer; and
means for performing, in response to a first type of instruction identifying a given means for storing, a predetermined operation for a target range of addresses determined at least in part on the basis of the range information associated with the pointer stored in the given means for storing.

At least some examples provide a method for an apparatus comprising one or more bounded pointer storage elements each to store a pointer having associated range information indicative of an allowable range of addresses for said pointer; the method comprising:
receiving a first type of instruction identifying a given bounded pointer storage element; and
in response to the first type of instruction, performing a predetermined operation for a target range of addresses determined at least in part on the basis of the range information associated with the pointer stored in the given bounded pointer storage element.

Further aspects, features and advantages of the present technique will be apparent from the following description of examples, which is to be read in conjunction with the accompanying drawings, in which.

Some specific examples of the present technique will be discussed below.

Some processing apparatuses may support the use of bounded pointers. The pointer itself may point to the address of a data value to be accessed or an instruction to be executed, for example. However the pointer may also have associated range information which indicates an allowable range of addresses for the pointer. This can be useful for example for ensuring that the pointer, or an address derived from the pointer, remains within certain bounds to maintain security or functional correctness of behaviour. For example, there is increasing interest in capability-based architectures in which certain capabilities are defined for a given process, and an error can be triggered if there is an attempt to carry out operations outside the defined capabilities. The range information for a bounded pointer may be part of the capability information defined for such architecture. Alternatively, there may be some non-capability based architectures which allow bounded pointers to be defined.

Hence, an apparatus may have at least one bounded pointer storage element for storing a pointer having associated range information indicative of an allowable range of addresses for the pointer. Each bounded pointer storage element could be a register, or location on a stack memory for example. Certain instructions may carry out an operation using the bounded pointer stored in a target bounded pointer storage element. The target bounded pointer storage element can be any one of the at least one bounded pointer storage element, and could be specified in the instruction encoding, could be a storage element selected by default, or the target bounded pointer storage element could be identified by a control value stored in another storage element such as a register or stack location.

In systems supporting bounded pointers, instructions which reference the bounded pointer would typically use the pointer value itself to carry out the corresponding processing operation, and the corresponding range information may be used solely to determine whether that use of the pointer is allowed or not. The range information itself would not typically affect the particular processing operation being performed, other than determining whether the operation is allowed in the first place. However, the inventor recognised that it can be very useful to provide support for a new type of instruction which performs an operation on a target range of addresses determined at least in part based on the range information associated with a bounded pointer. Hence, the range information of a bounded pointer may itself be used as operand information which influences the actual processing operation to be performed.

Therefore, processing circuitry may be provided which is configured to perform, in response to a first type of instruction identifying a given bounded pointer storage element, a predetermined operation for a target range of addresses determined at least in part on the basis of the range information associated with a pointer stored in the given bounded pointer storage element. For example, the processing circuitry may have instruction decoding circuitry for decoding the first type of instruction to generate control signals for controlling the processing circuitry to perform the predetermined operation using all or part of the range of addresses indicated by the range information.

This approach can provide several advantages. Firstly, by providing a single instruction to trigger operations for a range of addresses selected depending on the range information, this can greatly improve code density and reduce the number of instructions to be processed compared to systems which would have had to execute individual instructions for each address within the specified range.

Also, the new type of instruction can be particularly useful since when establishing the allowable range for a given bounded pointer, it may sometimes be desirable to perform some operation on the addresses within the allowable range in order to initialize the corresponding storage locations ready for these locations to be referenced by the pointer itself. For example, prior to carrying out a process using a pointer which could take any value within a given allowable range, it may be desirable to perform an operation to clean or invalidate data within the corresponding storage locations of the addresses within the allowable range, or to set the data in each of those addresses to some predetermined value. Hence, providing a first type of instruction which can trigger a given processing operation to be performed for the addresses within the allowable range corresponding to a bounded pointer can be useful for the process which defines the allowable range information in the first place.

Another advantage can be that, by using the range information associated with the bounded pointer in the target bounded pointer storage element to control the predetermined operation across a target range of addresses determined based on the allowable range of addresses, the first type of instruction itself does not need to explicitly specify the start and end addresses for the target range of addresses for which the predetermined operation is to be applied. This may be useful since the process executing the predetermined operation may not actually know the allowable range of addresses associated with the bounded pointer (for example, the allowable range may have been set by a more secure process), and in some cases it may even be undesirable for a less secure process to know the allowed range of pointer values set by a more secure process, for example if this information could allow the location of certain secure code or data to be inferred. Hence, by simply referencing a given bounded pointer, the associated range information can be used to trigger the predetermined operation across the allowable range without actually needing the current process to be aware of the range in which the operation is being performed.

Hence, there may be a number of reasons why it can be useful to provide instruction set architecture support for a type of instruction which takes a given bounded pointer and uses the associated range information associated with that pointer to carry out a given operation on a target range of addresses determined based on the range information. In some systems there may be only be one such instruction provided to carry out a particular operation across the allowable range of addresses. Other systems may support a number of instructions of this type, with each instruction corresponding to a different predetermined operation which is to be performed for the addresses in the allowable range.

The target range of addresses may be determined based on the range information in different ways. The target range of addresses may lie within the allowable range (i.e. the allowable range comprises the target range). In some examples, the target range of addresses may be the entire range of addresses indicated as allowable by the range information. In other examples, the target range of addresses may be just part of the allowable range, for example the portion lying between the pointer value itself and one of the upper and lower addresses of the allowable range.

In some cases, the allowable range for a given bounded pointer identifies the range of addresses which the pointer itself is allowed to take. In other cases, the allowable range may be an allowable range for addresses derived from the pointer (not necessarily the pointer itself). For example, for instructions which add an offset to the pointer, the allowable range could define the allowable range of addresses which the sum of the pointer and the offset is allowed to take. Hence, while an allowable range is defined for a given pointer, this does not necessarily require the pointer itself to lie within the allowable range, as it could be an address derived from the pointer which is governed by the allowable range.

Figure 1:
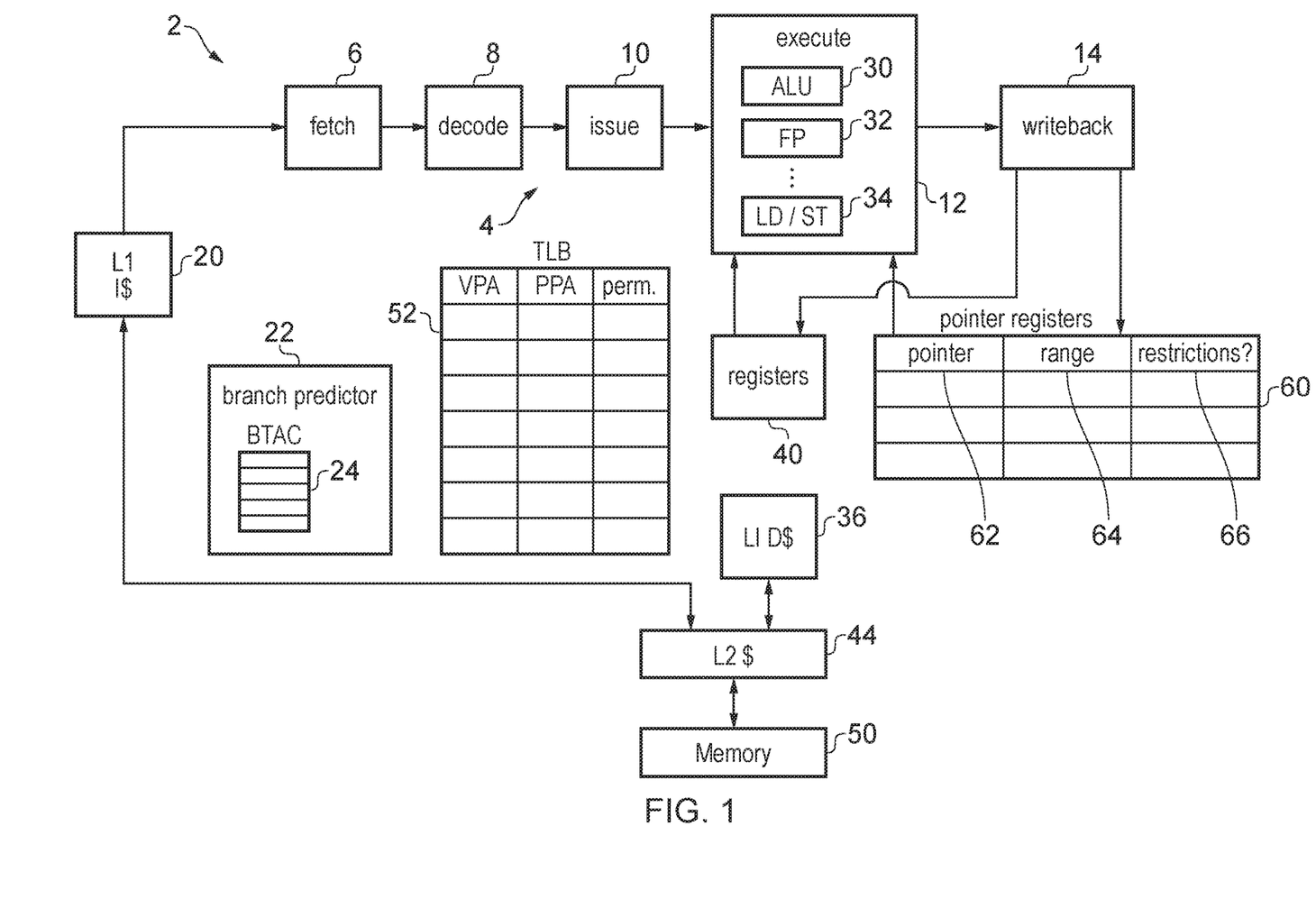
FIG. 1 schematically illustrates an example of an apparatus for processing data which supports bounded pointers having associated range information identifying an allowable range of addresses for the pointer.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some examples may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from an level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some embodiments, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Each pointer register 60 includes a pointer value 62 identifying an address of a data value or instruction to be accessed and range information 64 specifying an allowable range of addresses for the corresponding pointer 62. Optionally, the bounded register 60 may also include other restriction information 66 which may define one or more restrictions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers (or values derived from the pointers) remain within certain known bounds and do not stray to other areas of the memory address space which might contain sensitive or secure information for example.

Figure 2:
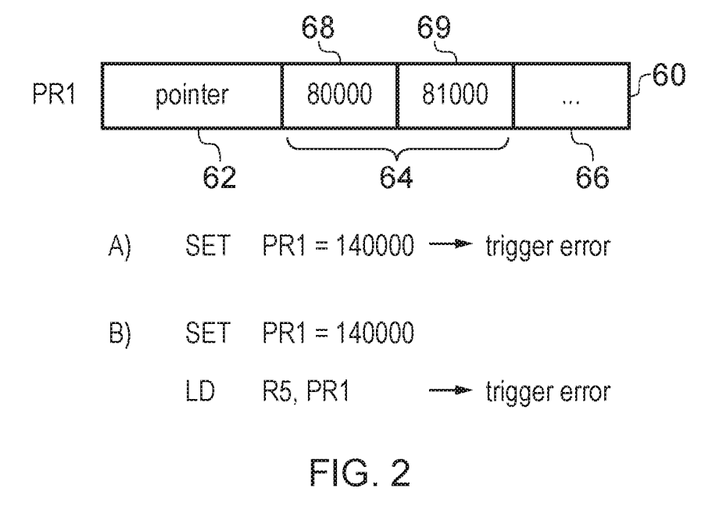
FIG. 2 shows examples of types of instruction for which an error is triggered if an address determined using a pointer value lies outside the range indicated by the associated range information.

For example FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the pointer 62 is outside this range.

For example, as shown in part A of FIG. 2, in some systems an error may be triggered if there is an attempt to set the value of the pointer 62 in the pointer register 60 to a value lying outside the range specified by the range information 64. This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access or instruction access at the pointer address is attempted then an error may be triggered if the address lies outside the allowed range. Other systems may trigger errors in response to both the types of instruction shown in parts A and B of FIG. 2.

Also, in some examples, some instructions may add an offset to the pointer value stored in a given bounded pointer register. In this case, an error may be triggered if the sum of the pointer and the offset lies outside the allowable range specified by the range information 64.

The range information 64 could be set in different ways. For example secure code, or an operating system or hypervisor, may specify the allowable range for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

Figure 3:
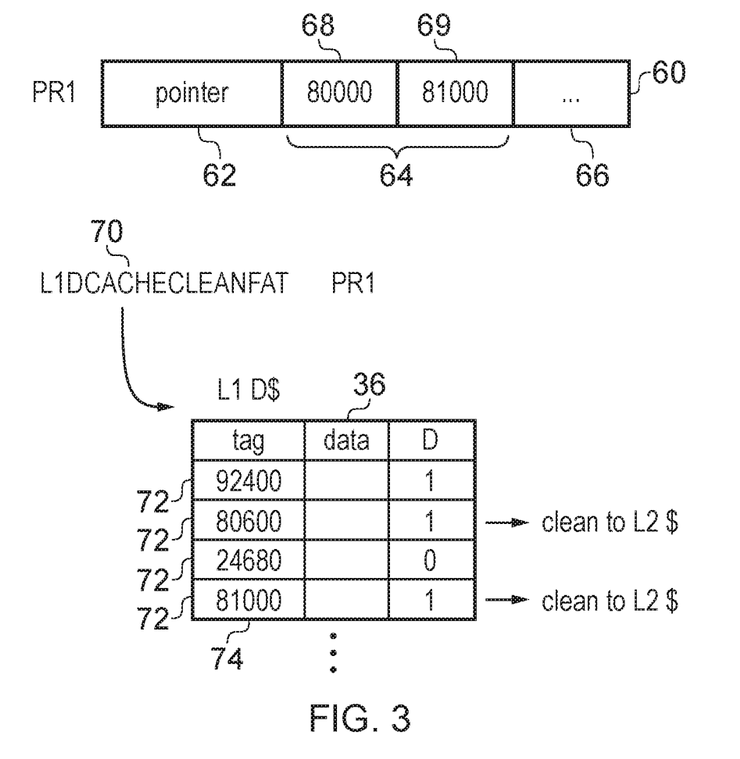
FIG. 3 shows an example of a type of instruction for triggering a predetermined operation to be performed on a target range of addresses determined at least partly based on the range information for a bounded pointer.

As shown in FIG. 3, the range information 64 associated with a bounded pointer may be exploited by a new type of instruction which may trigger a given operation to be performed for a target range of addresses determined based on the range information 64. For example FIG. 3 shows an example of a cache cleaning instruction for triggering an operation to clean data values in the L1 data cache 36. The cache cleaning instruction 70 specifies as an operand a register specifier identifying one of the bounded pointer registers 60 as a target bounded pointer register. For example in this case register PR1 is specified. In response to the instruction, the processor 12 triggers a cache cleaning operation to clean data values within any entries 72 of the cache 36 which store data associated with an address lying within the range of addresses specified by the range information 64 of the target bounded pointer register PR1. In the example of FIG. 3, the first and third entries have tag values 74 indicating addresses outside the allowable range 80000-81000 defined in the range information 64, and so these entries are not cleaned. However, dirty values stored in the second and fourth entries are cleaned and written back to the L2 cache 44 because their corresponding tags indicate addresses within the allowable range indicated by the range information 64. Note that a single register specifier PR1 in the instruction 70 is enough to identify the range of addresses over which the cleaning operation is to be performed—there is no need to identify the start and end addresses of the range in the instruction encoding.

Other types of instruction could operate using the range information 64 of the bounded pointer in a similar way. For example other types of cache maintenance operation could be performed on the L1 data cache 36 or the L1 instruction cache 20. For example, rather than performing a clean operation to write back (to memory or a further level cache) any dirty data values from entries corresponding to addresses in the defined range, an invalidate operation could be performed to invalidate the data from such entries (with dirty data in such entries being lost during an invalidation). Alternatively, a clean and invalidate operation could be performed so that data is first cleaned by writing back any dirty data to the L2 cache 44 and then invalidated so that it no longer is resident in the L1 data cache 36 (unlike the invalidate operation, the clean and invalidate operation would preserve dirty data).

Also, it is possible to perform cache maintenance on other cache like structures within the system such as the branch target address cache 24 or the TLB 52. For example, a single instruction specifying a given bounded pointer register 60 can trigger invalidation of any entry within the BTAC 24 or TLB 52 which corresponds to an address in the range specified by the range information 64 of the target bounded pointer register 60. For a cache like structure having multiple levels of cache hierarchy (such as the TLB or data/instruction caches), different forms of the cache maintenance instruction can be provided targeting different levels of the cache at which maintenance is to be performed. Alternatively, some configuration information could specify the point of the cache hierarchy to which cache maintenance is performed. For instance, some cache maintenance operations could require invalidation or cleaning down to the L2 cache, while others may perform deeper maintenance to a further level cache or to the main memory.

Also, the processing pipeline 4 may have architectural support for instructions for triggering other types of operation for the range of addresses marked by the range information 64. For example a setting instruction which sets the data values at each address within the specified range to a predetermined value could be provided. The predetermined value could be zero or some other fixed value. Hence, by executing a single instruction, all the data values within the range of addresses specifying the range of information 64 could be cleared to zero or some other value.

Similarly, an instruction could be provided for copying respective data values into storage locations having the range of addresses marked by the range information 64. The data values to be copied into the allowed range of addresses could be identified by addresses specified in registers 40 or in the instruction encoding, or could be identified by specifying a second bounded pointer register 60 whose range information 64 identifies the range of addresses including the data values to be copied to the addresses marked by the range information 64 in a first bounded pointer register 60.

Another instruction of this type may be a search instruction which may specify a particular data value to be searched for in storage locations having addresses within the range indicated by the range information 64 of a specified pointer register 60.

Hence, there may be a range of instructions of this type ("first type of instruction"), which specifies a target bounded pointer storage location 60. In response, the processing pipeline 12 performs a given processing operation in respect of a target range of addresses determined based on the allowable range of addresses 64 defined for the target bounded pointer storage location 60. This type of instruction may be provided in addition to the second type of instruction of the form shown in FIG. 2 which uses the range information to govern whether a given use of the pointer is allowed.

Instructions of the first type can be implemented in a number of different ways within the pipeline 4, depending on the particular micro-architecture provided in a given implementation. For example, in some systems a single instruction of the first type could be decoded by the decode stage 8 into a number of individual micro-operations each specifying a single address in the range defined by the range information 64, which can then be executed individually to carry out the operations across the required range. This approach may be simpler to implement at the execute stage 12 and any storage structure since the decoded micro-operations can then be treated in the same way as a single instruction for triggering the corresponding operation on a given address. Nevertheless, code density in the instruction cache 20 and memory 50 can be improved because a single instruction of the first type can trigger the operations to be performed across the range, and also security can be improved because the programmer writing the code including the instruction of the first type need not be aware of the allowable range of addresses for the pointer.

Alternatively, the decode stage 8 could decode the first type of instruction into a single operation passed to the execute stage 12, and the execute stage 12 may have circuitry for triggering a number of individual operations for each address. Alternatively, the execute stage 12 may issue a single command to the memory/cache hierarchy specifying the required range of addresses based on the range information 64 of the required bounded pointer, and a control circuit associated with the memory or cache could be responsible for responding with individual operations for each address.

Note that while at an architectural level the first type of instruction triggers an operation to be performed in respect of a range of addresses indicated in the range information for a given bounded pointer, this does not necessarily mean that the micro-architectural implementation of this instruction would actually need to decompose the instruction into individual operations, one for each address in the range. For example, it may be possible to perform fewer operations which give the same result as if individual operations had been issued for each address. For example, for cache maintenance operations, the range of addresses indicated by the range information 64 could be relatively large and there may be relatively few entries in the cache 36, 20, 24, 52. If an individual operation was triggered for each address in the range, then this could require a large number of cache lookups, which may consume a significant amount of power since the tags would need to be searched for every address in the range. Instead, it can be more efficient to walk through each entry of the cache 36, 20, 24, 52 comparing the tag against the range of addresses specified, and performing maintenance on that entry if the tag lies within the range, so that it is not necessary to actually issue individual maintenance operations to each address. With this approach, each entry would only need to be looked up once in order to give the same result as individual maintenance operations to each address in the range. Hence, in general the predetermined operation may be performed for a target range of addresses determined based on the range information, but it is not essential (although still possible) to actually carry out separate operations for each individual address in the range.

Hence, there are a number of ways in which instructions of the type discussed above can be implemented at a micro architectural level.

Figure 4:
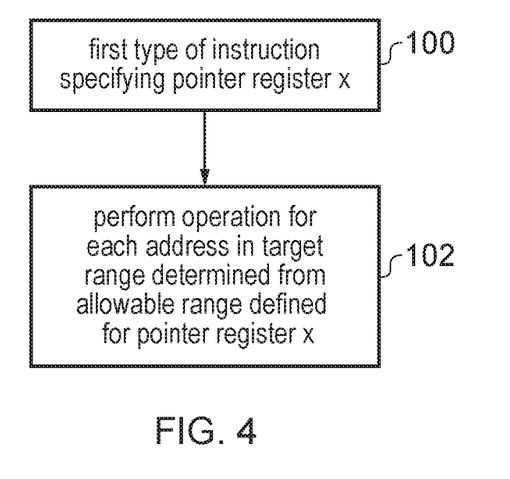
FIG. 4 shows an example of a method of executing a first type of instruction.

FIG. 4 shows a method of executing a first type of instruction, such as the cache cleaning instruction 70 shown in FIG. 3. At step 100 an instruction of the first type is encountered. This could be at the decode stage 8 where the decode stage could then map that instruction to a number of micro operations for carrying out the corresponding operations using the range of addresses, or could be at the execute stage 12 where this type of instruction is actually executed. In response to the first type of instruction, at step 102 the execute stage 12 triggers performance of a given processing operation across a target range of addresses determined based on the allowable range defined for the corresponding pointer register X specified in the first type of instruction.

Figure 5:
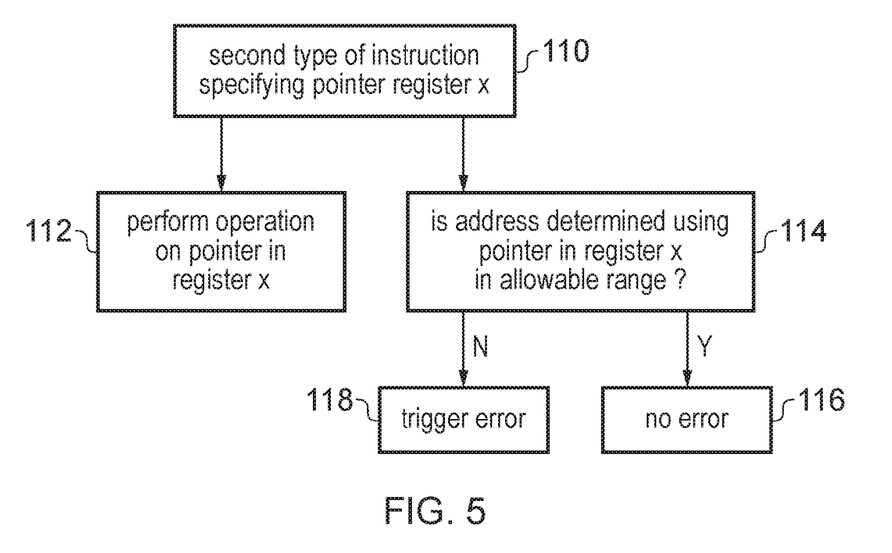
FIG. 5 shows an example of a method of executing a second type of instruction.

FIG. 5 shows a method of executing a second type of instruction, such as the pointer setting instruction or load instruction shown in FIG. 2 for example. At step 110 an instruction of the second type is encountered which specifies a bounded point register X. At step 112 the processing pipeline 4 performs a given processing operation using the pointer 62 specified in the bounded point of register X. Meanwhile, at step 114 the pipeline 4 determines whether an address determined using the pointer 62 in the bounded pointer register X is within the allowable range indicated by the range information 64. The address determined using the pointer 62 could be the pointer 62 itself, or an address derived from the pointer such as the sum of the pointer and an offset. When the address determined using the pointer is within the allowable range, then no error is triggered at step 116, while when the address is outside the allowable range then at step 118 an error is triggered. For example the error may trigger processing of a security exception or another routine for dealing with addresses outside the allowable range. Steps 114 to 118 may in some cases be performed in parallel with step 112, or could be performed before or after step 112. For example, in some cases the operation using the pointer 62 could be allowed to proceed but then an error may be triggered and processing cancelled if a range violation is detected. In other cases the range check may be carried out first, and the operation using the pointer 62 may only proceed in the absence of a range violation.

In some cases, for instructions of the first type, the operation performed for each address within the specified range can be independent of the actual value of the pointer 62 itself. For example, the cache maintenance instruction shown in FIG. 3 does not consider the pointer value 62 at all, and the cache maintenance operation depends only on the range specified in the range information 64. This is unusual for architectures supporting bounded pointers, for which the operations using the bounded pointer register would normally act on the pointer value itself and would be independent of the range information.

Figure 6:
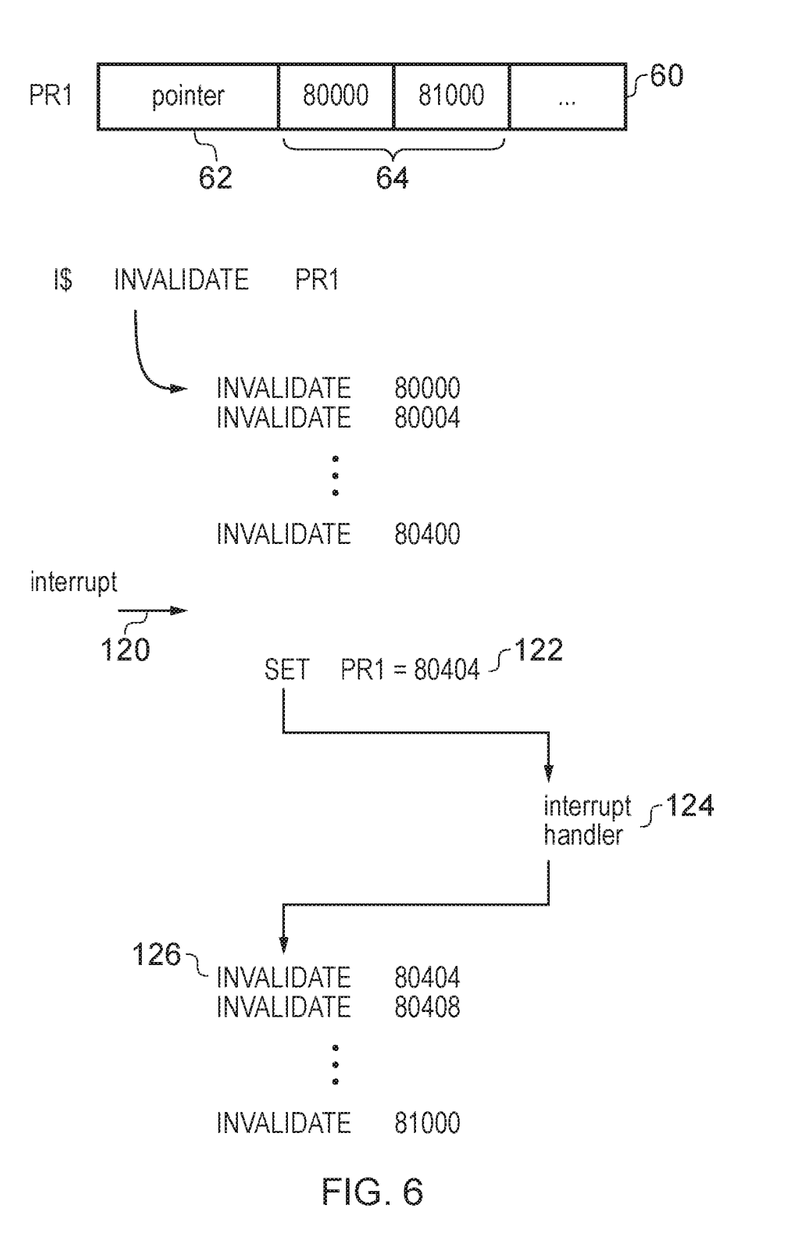
FIG. 6 shows an example of handling an interrupt received part way through carrying out the operations in response to the first type of instruction.

However, on some occasions it is also possible for the processing operation performed in response to the first type of instruction to depend, at least in part, on the pointer value 62 itself as well as the range information 64. For example, as shown in FIG. 6, when performing a series of operations for each address within the specified range, it is possible that an interrupt might be received part way through these operations. For example, FIG. 6 gives an example of an instruction for carrying out invalidations in the instruction cache 20 for each address within the specified range. When the interrupt 120 occurs at point 122, the last address for which an invalidation was carried out can be set to the pointer 62 of the target bounded pointer register. Processing then switches to execution of an interrupt handler 124 to carry out whatever processing needs to be performed in response to the interrupt. On returning from the interrupt processing, at point 126 invalidations may restart at the address indicated by the pointer 62, so that it is not necessary to repeat the invalidations for the addresses which had already been completed before the interrupt 120. Hence, the pointer value 62 could be used as a means of tracking progress of the first type of instruction to avoid needing to repeat operations already carried out.

Note that FIG. 6 shows an example in which the first type of instruction is decomposed into individual operations per address, but as mentioned above, other micro-architectures could implement equivalent operations in a different way, for example by checking each cache entry to see whether it contains data for an address in the specified range.

The examples above show a particular embodiment in which the range information 64 for a given bounded pointer is represented by a lower bound 68 and upper bound 69, and in which the range information 64 is stored in the same register as the pointer 62. However, FIGS. 7 to 9 show other ways in which the range information associated with a given bounded pointer can be represented.

Figure 7:
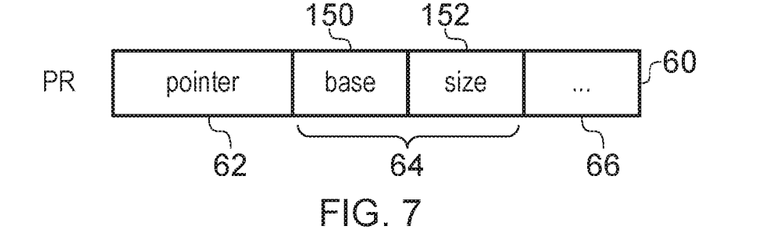
FIGS. 7 to 9 show alternative ways of representing range information for a bounded pointer.

As shown in FIG. 7, the range information 64 could be represented instead by a base address 150 and a size parameter 152 identifying a size (e.g. 4K, 8K, etc) of the range of addresses starting from the base address 150.

Figure 8:
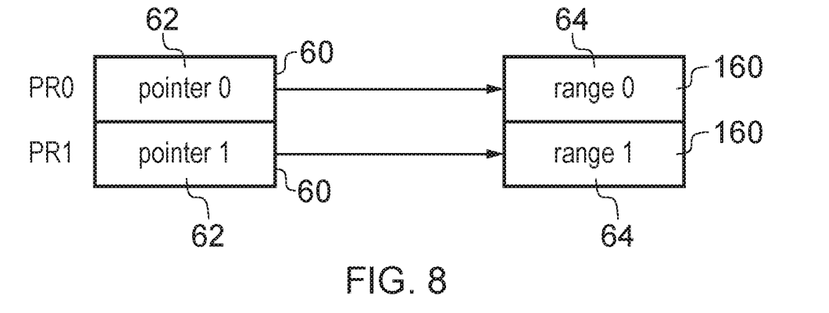
Figure 9:
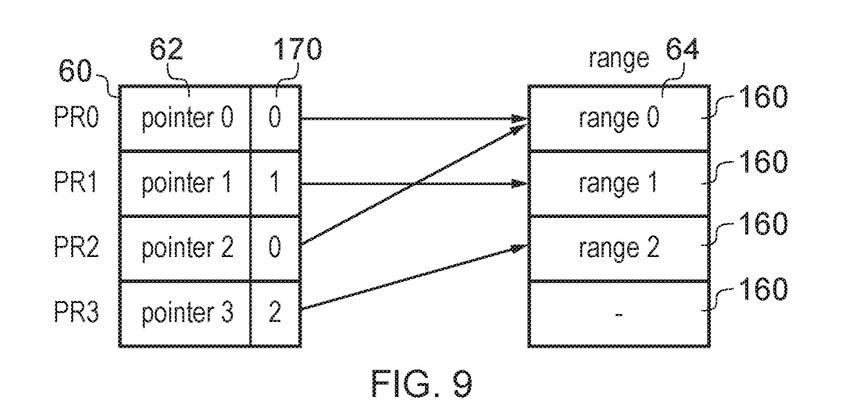

Also, as shown in FIGS. 8 and 9, it is not necessary for the range information 64 (or the other restriction information 66) to be stored in the same register as the pointer 62 itself. For example, the pointer registers 60 could merely store the pointer 62 and then some other storage elements 160 (further registers or locations on a stack or in a memory) may be provided for storing the corresponding range information. As shown in FIG. 8, in some cases there may be a one to one mapping between each pointer register 62 and a corresponding range storage element 160 so that to access the range information for a given pointer the processor can simply read the corresponding range storage element 160.

As shown in FIG. 9, in other cases there may be a variable mapping between the pointer registers 60 and the range storage elements 160. For example, as shown in FIG. 9, each pointer register 60 may specify a pointer 62 together with a range identifier 170 which identifies which of the range storage elements 160 stores the range information for that pointer. This can be useful because it allows multiple pointer registers 60 to correspond to the same piece of range information (e.g. pointer registers PR0, PR2 in FIG. 9 refer to the same range information), so that the number of range storage elements is reduced. It may be relatively common for multiple pointers to have the same capabilities defined, so this approach may reduce the circuit overhead for implementing this compared to defining the capabilities separately for each pointer.

Also, while FIG. 1 shows pointer registers 60 which are separate from the general purpose registers 40 for storing general integer or floating point values, in other examples there may be a common set of registers which may store either general data values or bounded pointers. Values which are not bounded pointers may have the range information 64 (and restriction 66 if provided) set as invalid. Hence, in this case the bounded pointer registers 60 may simply be some of the general purpose registers for which valid range information is set.

Also, the bounded pointers could also be stored in other kinds of storage element, not necessarily registers. For example, some architectures may access pointers on a stack memory, and in this case an instruction may reference the stack in order to access a given pointer. Hence, an instruction which references a bounded pointer on the stack could then be used to trigger a given processing operation to be applied to the range of addresses indicated by the range information associated with the bounded pointer that is stored in the referenced stack location.

The examples above show an instruction specifying a bounded pointer as an operand, for which a given operation is performed for each address within the allowable range indicated by the range information for the bounded pointer.

Figure 10:
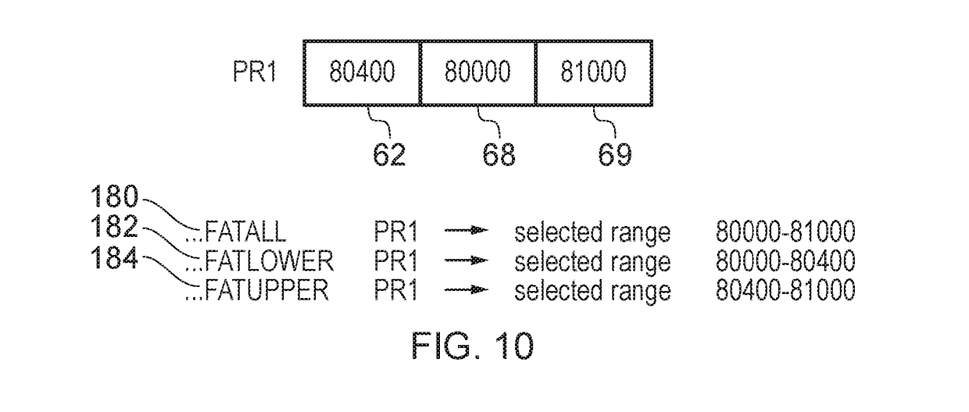
FIG. 10 shows examples of different forms of the instruction for which the operation is applied to different portions of the allowable range of addresses for a bounded pointer.

However, as shown in FIG. 10, it is also possible to provide forms of the instruction in which the predetermined operation is performed for a target range of addresses corresponding to only part of the allowable range. For example, as shown in FIG. 10, different forms of the first type of instruction could be provided. An instruction of a first form 180 may trigger a given processing operation for a target range of addresses corresponding to the entire allowable range. An instruction of a second form 182 may trigger the processing operation to be performed for a target range of addresses lying between the lower address 68 of the allowable range and the pointer address 62 itself. An instruction of a third form 184 may trigger the processing operation to be performed for a target range of addresses between the pointer address 62 and the upper address of the allowable range (the upper address could be determined either from an upper limit value 69 as shown in FIG. 10 or from a base address 150 and size indication 152 as in FIG. 7). The third form 184 of the instruction may for example be useful in the situation shown in FIG. 6 to allow the operation to restart following an interrupt at the address reached before the interrupt was received.

A given processor implementation may support any one, two or all of these forms of instruction 180, 182, 184. For some types of operations (e.g. cache cleaning) several of these forms may be supported to provide flexibility in applying the operation to different portions of the allowable range, while other types of operations (e.g. searching for a specified value) may only support one form of the instruction (e.g. the form where the target range is the entire allowable range).

Hence, in general, the first type of instruction may trigger an operation to be performed for a target range of addresses determined at least in part based on the range information for a given bounded pointer. Optionally, the target range could also be determined based on other parameters such as the value of the pointer itself or a further input operand indicating a boundary for the target range.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
one or more bounded pointer storage elements, each to store a pointer having associated range information indicative of an allowable range of addresses for said pointer;
a cache comprising a plurality of entries, each entry to store data associated with a corresponding address; and
processing circuitry to:

in response to a first type of instruction identifying a given bounded pointer storage element, perform a predetermined operation on data stored in the cache, corresponding to each address in a target range comprising a plurality of addresses determined at least in part on the basis of the range information associated with the pointer stored in the given bounded pointer storage element, said first type of instruction being a cache maintenance instruction for which the predetermined operation comprises performing a cache maintenance operation on selected entries for which the corresponding address is within the target range of addresses; and in response to a second type of instruction, different from the first type of instruction, identifying a specified bounded pointer storage element:

perform an operation on the pointer stored in said specified bounded pointer storage element, the operation being one of an instruction for setting the pointer stored in said specified bounded pointer storage element and an instruction for accessing a data value from the address determined using the pointer stored in said specified bounded pointer storage element; and trigger an error condition when an address determined using the pointer stored in said specified bounded pointer storage element is outside the allowable range of addresses indicated by the range information for the specified bounded pointer storage element.

2. The apparatus according to claim 1, wherein the allowable range of addresses comprises the target range of addresses.

3. The apparatus according to claim 1, wherein the target range of addresses comprises all of the addresses within the allowable range of addresses.

4. The apparatus according to claim 1, wherein the target range of addresses comprises the addresses between an address indicated by the pointer and an upper address or lower address of the allowable range of addresses.

5. The apparatus according to claim 1, wherein the one or more bounded pointer storage elements comprise one or more registers.

6. The apparatus according to claim 1, wherein the cache comprises at least one of:
a data cache;
an instruction cache;
a translation lookaside buffer; and
a branch target address cache.

7. The apparatus according to claim 1, wherein the cache maintenance operation comprises one of:
invalidating the data in the selected entries;
cleaning data in the selected entries; and
cleaning and invalidating data in the selected entries.

8. The apparatus according to claim 1, wherein the first type of instruction comprises a setting instruction for which the predetermined operation comprises setting data values to a predetermined value for each address in the target range of addresses.

9. The apparatus according to claim 1, wherein the first type of instruction comprises a copy instruction for which the predetermined operation comprises copying respective data values to each address in the target range of addresses.

10. The apparatus according to claim 9, wherein the copy instruction specifies a second bounded pointer storage element for which the allowable range of addresses indicated by the range information identifies a range of addresses of storage locations storing the respective data values to be copied.

11. The apparatus according to claim 1, wherein the first type of instruction comprises a search instruction for which the predetermined operation comprises searching for a specified value at each address in the target range of addresses.

12. The apparatus according to claim 1, wherein said predetermined operation is independent of the value of said pointer stored in the given bounded pointer storage element.

13. The apparatus according to claim 1, wherein in response to an interrupt occurring after performing the predetermined operation for some of the target range of addresses, the processing circuitry is configured to update the pointer in the given bounded pointer storage element to indicate an address at which the predetermined operation was interrupted; and after returning from processing of the interrupt, the processing circuitry is configured to restart performing the predetermined operation at the address indicated by the pointer in the given bounded pointer storage element.

14. The apparatus according to claim 1, wherein each bounded pointer storage element is configured to store the pointer and the associated range information.

15. The apparatus according to claim 1, comprising a further storage element to store the associated range information for the pointer stored in a corresponding bounded pointer storage element.

16. The apparatus according to claim 1, wherein the range information identifies a lower bound and an upper bound for the allowable range of addresses.

17. The apparatus according to claim 1, wherein the range information identifies one of a lower bound and an upper bound for the allowable range of addresses, and a size of the allowable range of addresses.

18. An apparatus comprising:
at least one means for storing a pointer having associated range information indicative of an allowable range of addresses for said pointer;
cache means comprising a plurality of entries, each entry to store data associated with a corresponding address; and
means for:
in response to a first type of instruction identifying a given means for storing, performing a predetermined operation on data stored in the cache means, corresponding to each address in a target range comprising a plurality of addresses determined at least in part on the basis of the range information associated with the pointer stored in the given means for storing, said first type of instruction being a cache maintenance instruction for which the predetermined operation comprises performing a cache maintenance operation on selected entries for which the corresponding address is within the target range of addresses; and in response to a second type of instruction, different from the first type of instruction, identifying a specified bounded pointer storage element:
performing an operation on the pointer stored in said specified bounded pointer storage element, the operation being one of an instruction for setting the pointer stored in said specified bounded pointer storage element and an instruction for accessing a data value from the address determined using the pointer stored in said specified bounded pointer storage element; and triggering an error condition when an address determined using the pointer stored in said specified bounded pointer storage element is outside the allowable range of addresses indicated by the range information for the specified bounded pointer storage element.

19. A method for an apparatus comprising one or more bounded pointer storage elements, each to store a pointer having associated range information indicative of an allowable range of addresses for said pointer, and a cache comprising a plurality of entries, each to store data associated with a corresponding address; the method comprising:
  receiving a first type of instruction identifying a given bounded pointer storage element; and
  in response to the first type of instruction identifying a given bounded pointer storage element, performing a predetermined operation on data stored in the cache, corresponding each address in a target range comprising a plurality of addresses determined at least in part on the basis of the range information associated with the pointer stored in the given bounded pointer storage element, said first type of instruction being a cache maintenance instruction for which the predetermined operation comprises performing a cache maintenance operation on selected entries for which the corresponding address is within the target range of addresses; and
  in response to a second type of instruction, different from the first type of instruction, identifying a specified bounded pointer storage element:
    performing an operation on the pointer stored in said specified bounded pointer storage element, the operation being one of an instruction for setting the pointer stored in said specified bounded pointer storage element and an instruction for accessing a data value from the address determined using the pointer stored in said specified bounded pointer storage element; and
    triggering an error condition when an address determined using the pointer stored in said specified bounded pointer storage element is outside the allowable range of addresses indicated by the range information for the specified bounded pointer storage element.

* * * * *